United States Patent [19]

Linder et al.

[11] 4,422,323

[45] Dec. 27, 1983

[54] COMBUSTION PROCESS OBSERVATION ELEMENT CONSTRUCTION

[75] Inventors: Ernst Linder, Mühlacker; Helmut Maurer, Vaihingen; Klaus Muller, Tamm, all of Fed. Rep. of Germany

[73] Assignee: Robert Bosch GmbH, Stuttgart, Fed. Rep. of Germany

[21] Appl. No.: 341,841

[22] Filed: Jan. 22, 1982

[30] Foreign Application Priority Data

Feb. 20, 1981 [DE] Fed. Rep. of Germany ....... 3106330

[51] Int. Cl.³ ............................................. G01M 15/00
[52] U.S. Cl. ......................................... 73/116; 73/35
[58] Field of Search ................... 73/116, 35; 350/96.1; 356/241, 315; 338/15, 19; 250/215, 239, 554

[56] References Cited

U.S. PATENT DOCUMENTS 2,666,148  1/1954  Arvintz et al. ................. 250/239 X
3,678,741  7/1972  Burley ................................. 73/116
3,978,720  9/1976  Ford ..................................... 73/116
4,036,050  7/1977  Dooley et al. .................... 73/119 A Primary Examiner—Jerry W. Myracle
Attorney, Agent, or Firm—Frishauf, Holtz, Goodman & Woodward

[57] ABSTRACT

To permit cleaning of the window of a combustion process sensor, a light pick-up element (12) is located in a housing holder (11) which is formed with a terminal flange (11b), seated against an extended flange (6) of a window structure (5) fitted in an opening (3) with a seating step (4) in the cylinder block of an internal combustion (IC) engine. A nut, or clamping plate, or similar attachment element holds the flanges of the window and of the housing against the abutment surface (4) in the cylinder block. To clean or replace the window (5), it is only necessary to disassemble the housing from the bore and thereby permit removal of the window therefrom, without requiring replacement of the light sensitive pick-up or components thereof as well.

9 Claims, 4 Drawing Figures

COMBUSTION PROCESS OBSERVATION ELEMENT CONSTRUCTION

Reference to related application, assigned to the assignee of this invention: U.S. Ser. No. 214,481, filed Dec. 9, 1980, MULLER, LINDER & MAURER now U.S. Pat. No. 4,393,687 the disclosure of which is hereby incorporated by reference.

The present invention relates to a combustion process observation element, and more particularly to the constructional features of such an element to permit its association with a housing structure, for example the cylinder block of an internal combustion engine, to permit observation of the combustion occurring during operation of the engine. The element is particularly suitable to detect unusual combustion conditions, for example upon knocking of the engine, or incipient knocking.

BACKGROUND

It is desirable, frequently, to monitor combustion processes occurring in internal combustione engines, which may be of the Otto type or of the Diesel type, and which use light sensitive elements, which may be supplied with light through a light guide to permit viewing of the actual combustion processes which occur upon ignition of an air-fuel mixture within the combustion chamber of the engine. Preferably, the combustion process should be monitored with respect to time, so that it can be monitored during actual operation of the engine, as the piston within the cylinder reciprocates. Observation may, for example, extend to the temporal and geometric distribution of the flame occuring during combustion; sensing of the ignition instant, sensing of fuel injection or fuel supply process; and, especially, sensing of undesirable or irregular combustion processes.

Irregular combustion may lead to knocking of the engine, Such knocking occurs under certain operating conditions. Knocking, as usually understood, is caused by oscillations within the audible frequency band of the compressed fuel-air mixture which is triggered by a shock wave. The heat transmission to the piston walls and the cylinder walls of the engine is substantially increased during such oscillations. A thermal overload of the surfaces will result, so that knocking should be avoided. For most efficient operation of the engine, however, it is desirable to utilize the working range of the engine to the greatest possible extent and, therefore, the engine should be operated just below the "knocking limit". It is necessary then to have some means which clearly and reliably indicate knocking, or a tendency to knock, so that the operating parameters of the internal combustion (IC) engine can then be so controlled that the engine will operate just below the knocking limit.

Various types of sensors to determine knocking have been proposed. Mechanical systems which sense the transferred oscillations to the engine, for example using a piezoelectric sensor, are easily made but have the disadvantage that such systems are difficult to operate reliably and free from interference and stray signals, since they also may respond to externally generated jolts and oscillations which arise in the operation of a vehicle to which the engine may be coupled, for example over bad roads or corrugated roads.

It has also been proposed to sense and observe the combustion process by optical means. An optical sensor and background literature are described in the cross-referenced application, assigned to the assignee of the present application, Ser. No. 214,481, filed Dec. 9, 1980, now U.S. Pat. No. 4,393,687 MULLER et al. This application discloses a sensor which include light guide fibers or filaments which are positioned to sense the combustion event optically, the light guides being connected to a photoelectric transducer which, in turn, provides output signals to a tuned or filter circuit which is responsive to or tuned to expected knocking frequency to provide an output signal if shock waves occurring within the combustion chamber are of a frequency which results in engine knocking. Of course, the signals derived from the photoelectric transducer can be processed in any desired manner. The aforementioned patent application further describes integration the light guide with a spark plug of an internal combustion engine; or to place light guides in the cylinder head gasket or seal, for eventual connection to photoelectric transducers.

Sensing physical parameters occurring with the combustion chamber of an IC engine by optical means causes problems: The optical element which faces the combustion, chamber, for example a glass rod, a fiber cable, or the like, will become dirty or blackened during operation, particularly upon extended operation, so that effective output and suitable measuring and evaluation of the light output becomes difficult, and in a limiting case even impossible after some operating time. Various proposals have been made to keep the side of the light guide facing the combustion chamber clean, or to so position and shape that portion of the light guide that it will be subjected to flushing action by induced fuel, swirling air-fuel gases, and the like, to thereby maintain the optical transmissivity thereof.

Windows which face combustion chambers, whether combustion chambers of IC engines, or other combustion chambers, are subject to contamination and accumulation of soot, or other particles which prevent transmission of light through the windows. The windows become dirty rapidly and, thus, it is desirable to so construct the sensors that the windows not only can be cleaned but, also, that they can be replaced, for example by clean windows or by windows which have not become contaminated or possibly damaged, for example pitted.

THE INVENTION

It is an object to provide a combustion process sensor construction which permits rapid exchange of viewing windows and, additionally, provides for viewing windows shaped to minimize damage and soiling thereof.

Briefly, the housing or block within which the combustion chamber is located is formed with a stepped bore or opening, and the window is formed with a flange fitting into the stepped opening. The housing of the sensor structure itself, which retains a light sensitive pick-up, such as, for example, a photo diode or similar element, or a pick-up end portion of a cable which conducts light to a remotely located photo diode, is formed with a flange which fits against the outer flange of the window structure. The flanges are pressed against a shoulder or seat formed by the stepped opening, preferably with interposed seals, and held in position by any suitable holder, for example a nut fitted around the sensor housing and pressing the flanges against the shoulder, a claw-type clamp, or the like.

The construction permits locating a window to view the combustion chamber by inserting the window from the outside through the wider or outer portion of the opening, to fit through the narrower or inner portion of the opening, and locating the opening itself at any suitable location. The inner face of the window may be corrugated or ribbed to improve its rejection of contaminants, and located to at least roughly match the overall contour of the combustion chamber. The window can be inserted through the wall of the block or housing defining the combustion chamber by insertion perpendicularly therethrough, or at a slant or inclination.

The structure has the advantage that the window becomes an element separate from the sensor construction, so that it can be readily and easily exchanged. The window portion thus is independent of the light pick-up structure at its holder, as such, that is, a photoelectric receiver or a light guide terminal, so that, upon exchange of the window, for example to replace a dirty one by a clean one, for subsequent re-use of the dirty one at a later time, only the inexpensive window portion need be exchanged and the expensive sensor, itself, re-assembled. Assembly is rapid and simple, suitable for do-it-yourself use, as well as by service personnel with minimal training.

In accordance with a feature of the invention, the window portion is introduced to the inner wall at an inclination, so that the light receiving surface to which the window is exposed is increased with respect to that in which a window is inserted perpendicularly through the wall of the housing or block.

DRAWINGS

Figure 1:
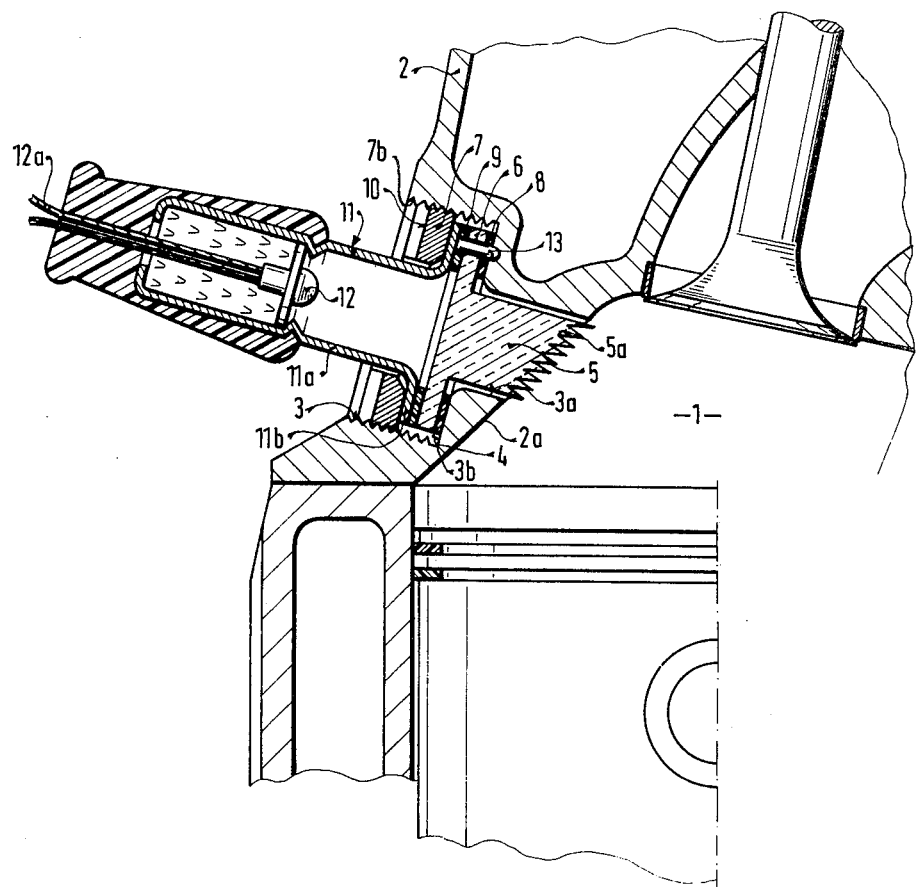
FIG. 1 is a schematic cross-sectional view through the cylinder head of an internal combustion engine illustrating one embodiment of the invention, in which the window is introduced at an inclination with respect to the shortest cross section of the cylinder block.

A combustion chamber 1 which, in FIG. 1, is illustrated as a combustion chamber of an internal combustion (IC) engine, is formed within the cylinder head 2 of the engine. A solid portion of the cylinder head has a stepped bore 3 formed therein. This stepped bore has an inner portion 3a which has a diameter which is smaller than the outer portion 3b. The two portions 3a, 3b are joined by a seating surface formed as a shoulder 4.

A window 5 is inserted into the opening 3 from the outside. The window 5 has a cross section which approximately matches that of the bores 3a, 3b; it is just slightly smaller. In top view, the window 5, like the bore 3, is circular. The window 5, thus, has a narrower portion 5a and a laterally extending flange 6. The window 5 preferably is a unitary element, although the flange 6 need not be transparent, and can be made of different material, fused to the window 5. The flange 6 engages the shoulder 4 of the stepped bore 3. A sealing ring or gasket 8 is located between the shoulder 4 and the flange 6.

The sensor itself is formed by a housing 11 which has a tubular portion 11a and a radially enlarged flange 11b.

The outer diameter of flange 11b fits within the enlarged opening 3b, and, for example, is at least approximately the same size as flange 6 of the window 5. The flange 11b is flat, so that it will fit against the flange 6 of window 5. A nut 7, with a central hole and which has an outer thread, is threaded into an inner thread formed in the outer portion 3b of the opening 3. Upon turning the nut 7 in the threads 7b of the portion 3b of opening 3, flange 11b of the housing is compressed against the flange 6 of the window. A gasket or seal 9, preferably, is interposed between flanges 11b and 6. Tightening the nut 7 secures the window 5 as well as the housing 11 in fixed location in the opening 3, and seals the combustion chamber. Nut 7 is formed with holding depressions, such as slits 10, to permit engagement thereof by a suitable turning tool, not shown, in order to rotate the nut 7 in the inner threads 7b and to assure a tight connection between the housing 11, the window 5, and the wall 2 of the cylinder head, or the cylinder block, depending on the construction of the IC engine.

The housing 11 retains a light pick-up element, for example a photo diode 12 connected by suitable cables 12a to a utilization circuit, not shown. The photo diode 12 is secured in the housing 11a in conventional manner, for example by being seated in a transverse plate, secured in the housing 11 by a casting compound and protected, externally, by a rubber or plastic bushing. Rather than using a photo diode 12, other elements may be used and, also, the end of a light guide may extend into the housing 11 which will provide a clear and unobstructed path of light from the window 5 to the light pick-up element 12.

A pin 13 is placed through the window 5 and a suitable bore formed in the flange 6 and the gasket 8 to fit into a depression or blind bore formed in the cylinder block 2 to prevent rotation of the window 5. Other arrangements, such as, for example, a non-circular outline of the window 5, or portions thereof fitting into similarly shaped portions of the opening 3 may be used. The pin 13 can be attached to the housing 11.

Operation: Light occurring upon combustion within the combustion chamber 1 will fall on the window 5 which, preferably, has a serrated surface, for example formed in concentric rings, to pass through the window 5 and to reach the light pick-up 12. The axis of the tubular housing 11 and of the window 5 extends at an angle with respect to the inner wall 2a of the cylinder head 2, which provides for an extended surface of window 5.

Figure 2:
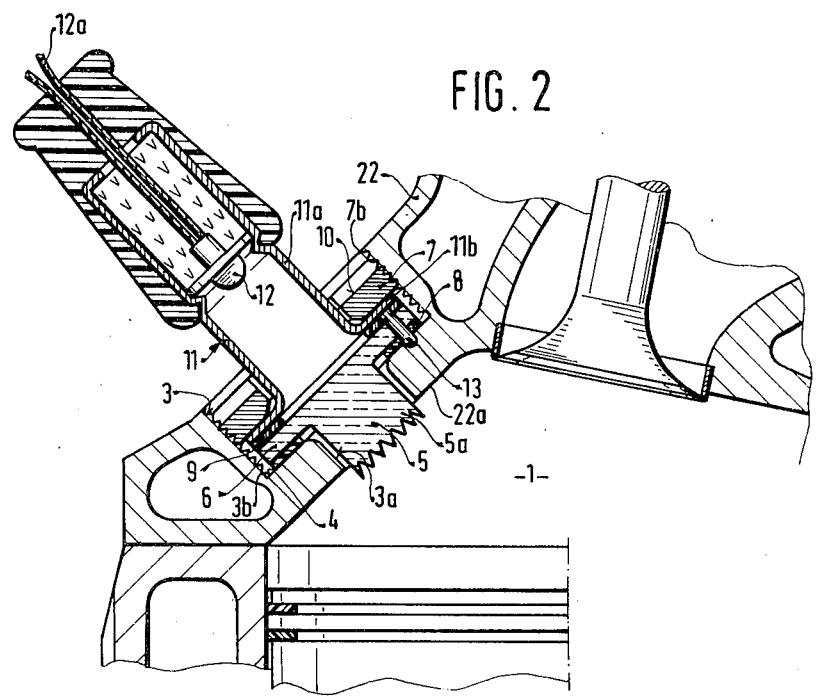
FIG. 2 is a schematic fragmentary cross section through the cylinder head of an internal combustion engine, and in which the window is introduced perpendicularly through the cylinder head to view the combustion chamber.

Embodiment of FIG. 2: The general construction is identical to that of FIG. 1; the difference is that the axis of the window 5 extends at right angle to the inner wall 22a of the housing structure 22. The choice of which embodiment to use will depend primarily on the arrangement and structural characteristics of the cylinder head or the cylinder block, and the location of cooling ducts therein. In general, the arrangement of FIG. 1 is preferred since it has the advantage that the inclined end portion of the window 5 has a larger light receiving surface.

The window 5 can easily be removed and exchanged without also exchanging the photoelectric pick-up arrangement. Combined sensors require such entire exchange if the window is unitary with the housing. The ease of exchange of the window portion 5 alone without further exchange of the light pick-up portion has the specific advantage that the surface of the window part can easily be kept clean, and that damaged surfaces, for example surfaces which are pitted, can be easily replaced without having to replace an entire photoelectric pick-up unit.

Figure 3A:
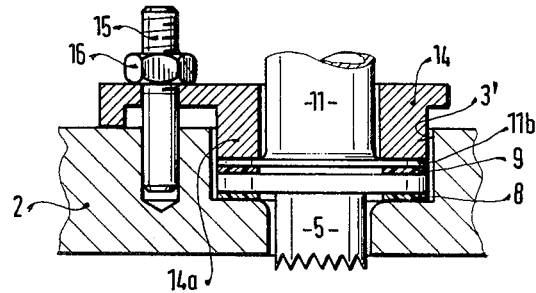
FIG. 3a is a fragmentary side view showing an embodiment for clamping the sensor in place.
Figure 3B:
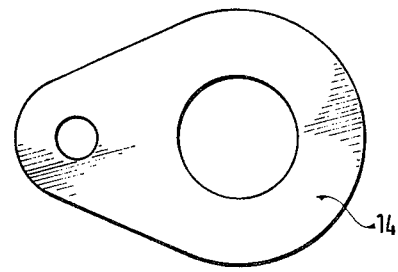
FIG. 3b is a top view of a separate clamping plate.

Various ways may be used to hold the housing 11 and the window 5 in position in the cylinder wall. A turned-in nut 7 is eminently suitable. As an alternative, a clamping arrangement as shown in FIGS. 3a and 3b can also be used. The clamp is a claw disk 14, with depending flanges—see FIG. 3a—which fit against the flange 11b of the housing, and which is positioned on the cylinder block, tightened by a nut 16 threaded on a bolt 15 which, in turn, is secured, for example by threading, spot-welding or the like, to the wall 2 of the cylinder block or cylinder head as the case may be. The window portion 5 is fitted into an opening 3' which has a step, as explained in connection with FIGS. 1 and 2. The opening 3' need not be threaded and can have a smooth outer wall. Sealing gaskets 8, 9 are preferably used, and a pin 13 may also be used if desired, although it is not strictly necessary since rotary forces will not be applied against the flanges of the window 5 and the housing 11. The holding clamp 14 is formed with an in-turned projecting ring 14a which fits into the outer portion of the bore 3' and bears against the flange 11b of housing 11.

Various changes and modifications may be made, and features described in connection with any one of the embodiments may be used with any of the others, within the scope of the inventive concept.

We claim:

1. The combination of a combustion chamber formed in a structural block (2, 22) particularly for observation of combustion within the cylinder block of an internal combustion engine to monitor combustion occurring therein, a combustion process observation element for observation of combustion within the combustion chamber, wherein the block is formed with an opening (3, 3') through which the observation element is introducible, and for retention therein, the opening including a stepped bore, having an inner portion (3a) adjacent the combustion chamber (1) of a predetermined diameter, and an outer portion (3b) remote from the combustion chamber, and which has a diameter larger than said predetermined diameter of the inner portion, and a seating surface (4) separating said inner and outer portions;

and wherein the observation element includes a separable assembly comprising a tubular housing (11) and light-sensitive pick-up means (12) located in the housing;

a window (5) closing off the opening and separating the interior of the combustion chamber (1) from the light-sensitive means (12), the window having an inner portion (5a) having a cross section to fit into the inner portion (3a) of the opening, and an outer flange (6) having a cross section larger than said cross section of the inner portion and fitting against said seating surface (4) of the opening (3, 3') in the block;

the tubular housing (11) being formed with a flange (11b) fitting against the flange (6) on the window;

and releasable positioning means (7, 14) securing and clamping the window and the housing in position with one surface of the flange (6) on the window fitting against the seating surface (4) of the opening (3), and one surface of the flange (11b) of the tubular housing (11) seated against an opposite surface of the flange (6) of the window (5), the releasable positioning means (7, 14) bearing against the opposite surface of the flange (11b) of the tubular housing, the tubular housing providing an unobstructed light path between the window and the light-sensitive pick-up means (12) and being separable from the window to permit separate, individual removal and replacement of the window, and of the housing with the light-sensitive pick-up means therein, respectively.

2. Combination according to claim 1, wherein (FIG. 1) the axis of the stepped bore (3) is inclined with respect to the wall surface (2a) of the combustion chamber adjacent the bore.

3. Combination according to claim 1, further including means (13) positioning the window in the bore in a predetermined rotary position.

4. Combination according to claim 1, wherein (FIGS. 1, 2) the securing and clamping means comprises a thread (7b) formed in the outer portion (3b) of the bore;

and a nut (7) having a central opening receiving the housing (11) for threaded engagement with said thread in the bore.

5. Combination according to claim 4, wherein the seating surface (4) is formed as an abutment shoulder extending at least approximately at right angles to the axis of the bore (3).

6. Combination according to claim 1, wherein (FIG. 3) the securing means comprises a clamp claw having an engagement portion (14) fitting against the flange (11b) of the housing at the side remote from the window;

and means (15, 16) securing said clamping claw to the structural block (2, 22).

7. Combination according to claim 6, wherein the seating surface (4) is formed as an abutment shoulder extending at least approximately at right angles to the axis of the bore (3).

8. Combination according to claim 1, further including cushioning, sealing and separating gaskets (8, 9) positioned adjacent the flange (6) of the window to permit tightening of the flange (11b) of the housing thereagainst to seat the flanges against the seating surface (4) without damage to the window.

9. Combination according to claim 1, wherein the seating surface (4) is formed as an abutment shoulder extending at least approximately at right angles to the axis of the bore (3).

* * * * *